US012473175B2

(12) United States Patent
Zeng et al.

(10) Patent No.: US 12,473,175 B2
(45) Date of Patent: Nov. 18, 2025

(54) ELEVATOR OPERATION QUALITY DETECTING SYSTEM AND DETECTING METHOD

(71) Applicant: FUJIAN SPECIAL EQUIPMENT INSPECTION AND RESEARCH INSTITUTE, Fuzhou (CN)

(72) Inventors: Qinda Zeng, Fuzhou (CN); Yao Lin, Fuzhou (CN); Jinneng Liu, Fuzhou (CN); Jian Zhang, Fuzhou (CN); Wei Zhang, Fuzhou (CN); Youyi Ye, Fuzhou (CN); Jinghe Chen, Fuzhou (CN); Zhongnan Xu, Fuzhou (CN)

(73) Assignee: FUJIAN SPECIAL EQUIPMENT INSPECTION AND RESEARCH INSTITUTE, Fuzhou (CN)

( * ) Notice: Subject to any disclaimer, the term of this patent is extended or adjusted under 35 U.S.C. 154(b) by 1450 days.

(21) Appl. No.: 17/043,804

(22) PCT Filed: Aug. 28, 2018

(86) PCT No.: PCT/CN2018/102627
§ 371 (c)(1),
(2) Date: Sep. 30, 2020

(87) PCT Pub. No.: WO2020/037692
PCT Pub. Date: Feb. 27, 2020

(65) Prior Publication Data

US 2021/0122611 A1 Apr. 29, 2021

(30) Foreign Application Priority Data

Aug. 21, 2018 (CN) ........................ 201810953086.8

(51) Int. Cl.
*B66B 5/00* (2006.01)

(52) U.S. Cl.
CPC .......... *B66B 5/0093* (2013.01); *B66B 5/0031* (2013.01); *B66B 5/0037* (2013.01)

(58) Field of Classification Search
CPC ... B66B 5/0093; B66B 5/0031; B66B 5/0037; B66B 5/0018; Y02B 50/00
See application file for complete search history.

(56) References Cited

U.S. PATENT DOCUMENTS 10,112,801 B2 * 10/2018 Madarasz ............. B66B 5/0037
11,365,089 B2 * 6/2022 Zhang .................. B66B 5/0037

FOREIGN PATENT DOCUMENTS

CN 102602762 A 7/2012
CN 102897626 A 1/2013
(Continued)

OTHER PUBLICATIONS

International Search Report issued in corresponding International application No. PCT/CN2018/102627, mailed May 20, 2019.
(Continued)

*Primary Examiner* — Bickey Dhakal
(74) *Attorney, Agent, or Firm* — HOWARD M COHN and Associates, LLC

(57) ABSTRACT

An elevator operation quality detecting system and a detecting method. The system comprises an elevator operation quality detector; the elevator operation quality detector comprises a power supply having a charging function, a central processing module, and a data transmission module, a data storage module, a data acquisition module and a touch display module which are connected to the central processing module; the data acquisition module is connected to a signal sensing module; the signal sensing module comprises a tri-axial acceleration sensor and a tri-axial angular velocity gyroscope which are both connected to the data acquisition module; the data transmission module comprises a GPRS wireless transmission module and a USB interface circuit
(Continued)

which are both connected to the central processing module; the central processing module is a DSP main controller.

3 Claims, 4 Drawing Sheets

(56) References Cited

FOREIGN PATENT DOCUMENTS

| | | | | |
|---|---|---|---|---|
| CN | 202808106 | U | | 3/2013 |
| CN | 105293238 | A | | 2/2016 |
| CN | 205802703 | U | | 12/2016 |
| CN | 107117519 | A | * | 9/2017 |
| JP | H07315709 | A | | 12/1995 |
| JP | 2005082253 | A | | 3/2005 |
| JP | 2005145620 | A | | 6/2005 |

OTHER PUBLICATIONS

Written Opinion of the International Searching Authority for No. PCT/CN2018/102627.

* cited by examiner

ELEVATOR OPERATION QUALITY DETECTING SYSTEM AND DETECTING METHOD

TECHNICAL FIELD

The disclosure related to detection of safety of elevator operation, in particular to an elevator operation quality detecting system and a detecting method.

BACKGROUND

Elevator operation quality detection comprises detection of acceleration, deceleration, speed and runout during elevator operation under no-load, different loads and overloads, such as the existing EVA series elevator comprehensive ride quality detector, which can instantaneously take the values of transportation quality, speed, elevator positioning, acceleration, deceleration, runout and noise and can be quickly calculated by the analysis software and draw a conclusion; for example, a patent (the patent number is 201210409708.3, named as: elevator operating condition monitoring system). However, the existing detectors have the following problems in the process of detection: 1. if the elevator compartment tilts within the allowable range, the data tested by the elevator will have errors; 2. under different load conditions, the elevator needs to carry heavy blocks to simulate the bearer during the detection process, as a result, it will take a lot of manpower to handle these heavy blocks; 3. only record data, there is no intuitive display of operating waveform parameters; 4. it is necessary for the detector to stand in the elevator to observe and record the operation state of the equipment; 5. it is impossible to counterweighting freely.

SUMMARY OF THE DISCLOSURE

To solve the above problems, one object of the present disclosure is to provide an elevator operation quality detecting system.

The disclosure is implemented by the following schemes: an elevator operation quality detecting system, comprising an elevator operation quality detector, the elevator operation quality detector comprises a power supply having a charging function, a central processing module, a data transmission module, a data storage module, a data acquisition module, and a touch display module; the data transmission module, the data storage module, the data acquisition module, and the touch display module are all connected to the central processing module; the data acquisition module is connected to a signal sensing module, the signal sensing module comprises a tri-axial acceleration sensor and a tri-axial angular velocity gyroscope which are both connected to the data acquisition module; the data transmission module comprises a GPRS wireless transmission module and a USB interface circuit which are both connected to the central processing module; the central processing module is a DSP main controller; wherein the detecting system further comprises a weighing limiting hearing frame, a water belt, a water charging/discharging hose; the elevator operation quality detector further comprises a square housing, four foot cushions are provided around a bottom of the square housing, the foot cushions are composed of small lifting cylinders, movable ends of the small lifting cylinders are provided with anti-slip gaskets; the small lifting cylinders are driven by cylinder driving circuits, the cylinder driving circuits are connected with the said central processing module; the weighing limiting bearing frame comprises a base and four limiting plates, the base is provided with a weighing area in a middle of the base, a periphery of the weighing area is provided with a limiting column, and bottoms of the limiting plates are provided with limiting holes for inserting the limiting column so that the four limiting plates form a limiting frame above the weighing area, in which a lower end of one limiting plate is provided with an opening, the water belt is placed in the limiting frame and a water charging/discharging outlet of the water belt are exposed by the opening; the water charging/discharging outlet is provided with a gate switch; one end of the water charging/discharging hose is connected to the water charging/discharging outlet and the other end is used to connect the water intake pipeline; a front side of the base is provided with a weight display panel, and the weight display panel shows a weight of water obtained in the weighing area plus a weight of the weighing limiting bearing frame itself.

In an embodiment of the disclosure, a side wall of the housing is provided with a handle.

In an embodiment of the disclosure, the touch display module can display a measuring waveform, and an interface of measuring waveform can be switched to a corresponding real-time waveform interface by clicking on buttons "X-axis", "Y-axis", "Z-axis" and "noise".

In an embodiment of the disclosure, a peripheral side of the base is provided with an adjustable strut, and an upper end of the adjustable strut is provided with a height adjustment hole to facilitate users to adjust the height of the adjustable strut through the height adjustment hole by an L-shaped steel bar; a bottom of the base is provided with universal rollers.

Another object of the present disclosure is to provide an elevator operation quality detecting method based on the elevator operation quality detecting system above mentioned, the method comprises following steps:

Step S01: operating the elevator to the lowest floor, opening the elevator, and assembling the weighing limiting bearing frame in an elevator compartment;

Step S011: placing the base in the elevator compartment, inserting the limiting plate to the corresponding limiting column to form a limiting frame, and locking the limiting frame through screw holes;

Step S012: placing the water belt in the limiting frame and exposing the water charging/discharging outlet from the opening;

Step S013: adjusting the said limiting column by the L-shaped steel bar to keep the said weight limiting bearing frame horizontal;

Step S02: connecting one end of the water charging/discharging hose to the said water charging/discharging outlet and the other end to the water intake pipeline to fill the water belt;

Step S03: when the weight display panel displays a specified value, stopping water filling; closing the gate switch and removing the water filling hose;

Step S04: positioning the elevator operationally detector in the elevator compartment and starting the elevator operation quality detector, after the elevator operation quality detector is started, collecting the initial balanced position of the elevator compartment according to the tri-axial angular velocity gyroscope and adjusting its horizontal position by controlling the small lifting cylinder;

Step S05: after the initial horizontal position is adjusted, starting the elevator base on the initial horizontal position so as to collect operation data of the elevator by the elevator operation quality detector.

In an embodiment of the disclosure, in Step S03, the specified value is set from low to high according to the elevator weighting measurement point.

In an embodiment of the disclosure, further comprises controlling the elevator from the lowest floor to the highest floor and then from the highest floor to the lowest floor.

In an embodiment of the disclosure, wherein when the elevator is at the lowest floor, one worker sets a floor to be stopped during the elevator ascent; after an ascending of the elevator is finished, another worker at the top floor sets a floor to be stopped when the elevator descends.

In an embodiment of the disclosure, wherein the measurement of the weighting measuring point of each elevator is repeated from Step S03 to Step S05.

The system and detecting method of the present disclosure can not only take values for transportation quality, speed, elevator positioning, acceleration, deceleration, runout, and noise, but further improve the accuracy of data collection during elevator operation, and solve the problems of handling loads during elevator detection. The disclosure realizes automatic horizontal position adjustment and calibration based on elevator operation quality detector, and the operation of the elevator is detected according to the different carrying weight. The disclosure simulates the carrying person by water distribution, which not only improves the safety in the detection process, but further facilitates operation. More prominent is that the disclosure solves the problem of counterweighting of analog bearers. Traditionally, the bearers are simulated by heavy blocks. Since the weights of heavy blocks are fixed, comprising 200 kg, 150 kg, 100 kg, 50 kg, etc., it is impossible to divide the lifts' loads finely (limited by the weight standard of heavy blocks), the operation quality can only be detected roughly based on the weight of heavy blocks. For example, three 150 kg+four 100 kg+one 50 kg=900 kg for quality detection. For weights such as 820 kg and 730 kg, the detection data can not be obtained. The disclosure solves the problem and enables free counterweighting.

DETAILED DESCRIPTION

The present disclosure is further described below in conjunction with the accompanying drawings.

Figure 1:
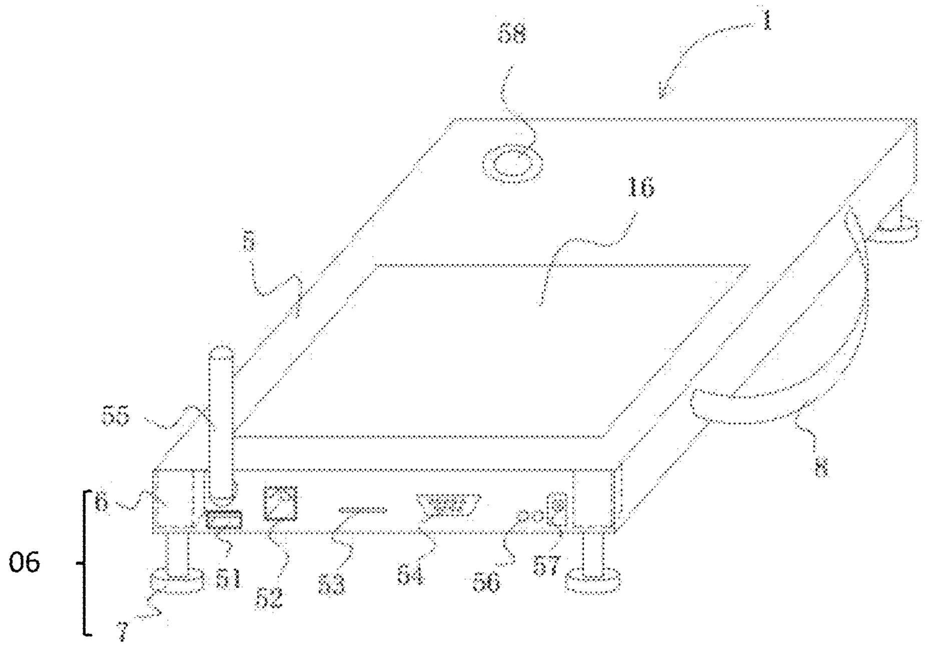
FIG. 1 is a schematic diagram of an elevator operation quality detector in an embodiment of the present disclosure.
Figure 2:
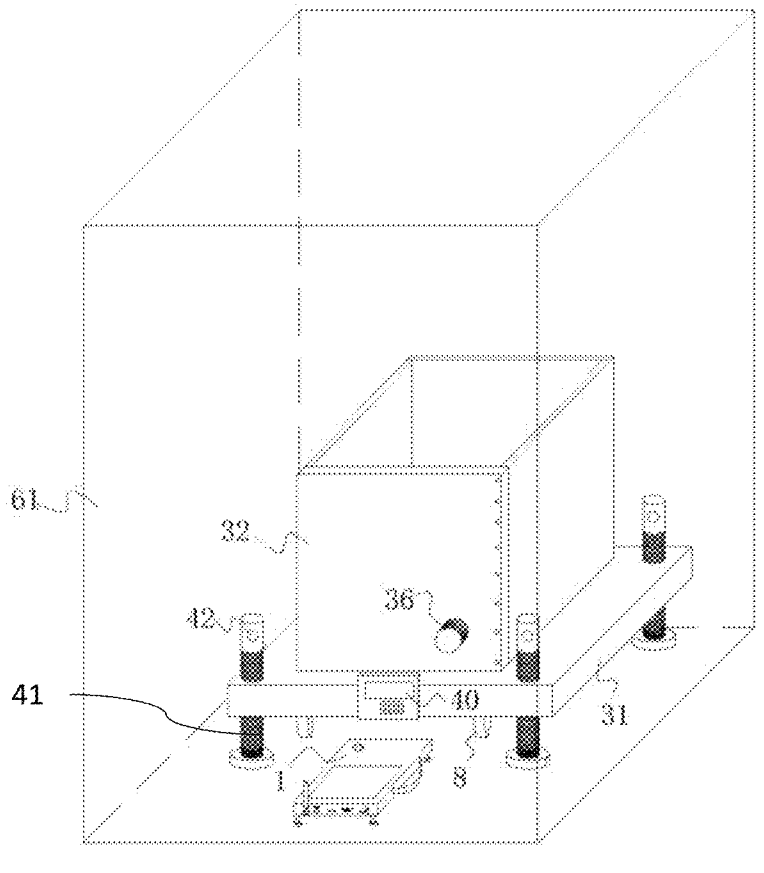
FIG. 2 is a schematic diagram of an elevator operation quality detecting system in an embodiment of the present disclosure.
Figure 3:
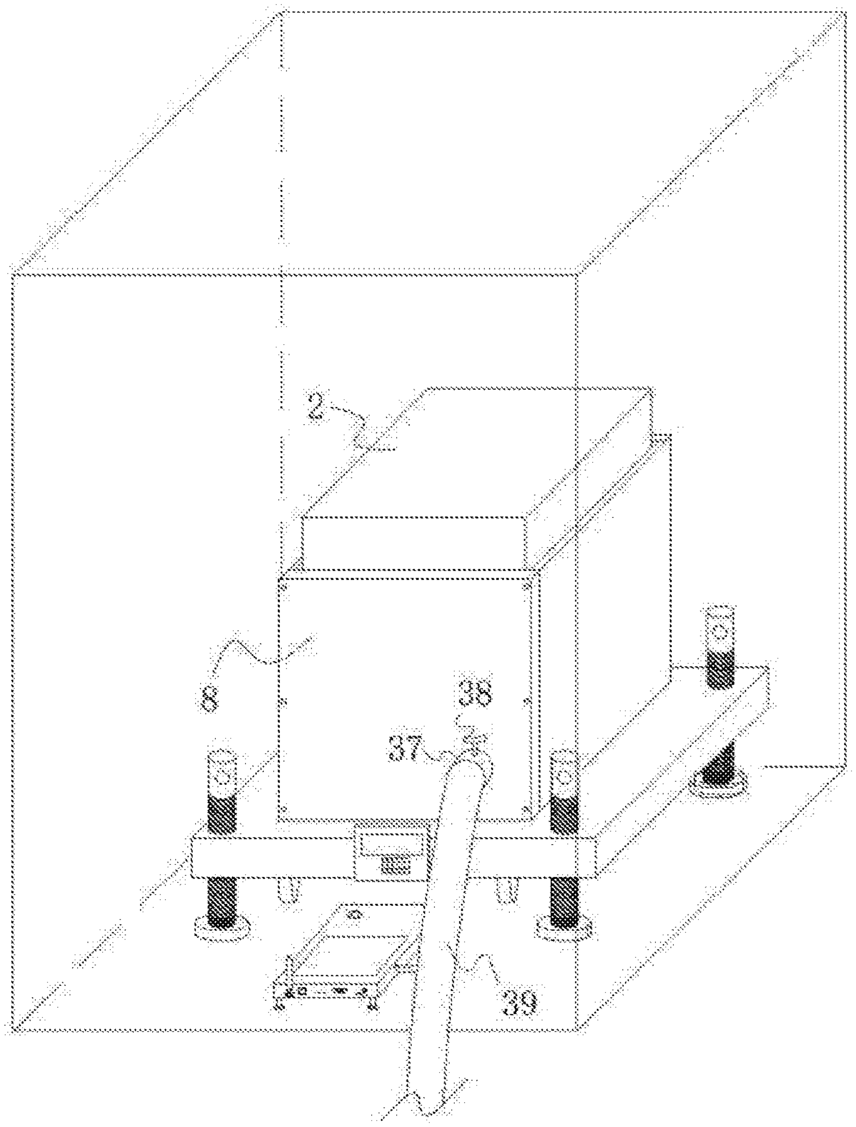
FIG. 3 is a schematic diagram of an elevator operation quality detecting system after being installed in a water belt in an embodiment of the present disclosure.
Figure 4:
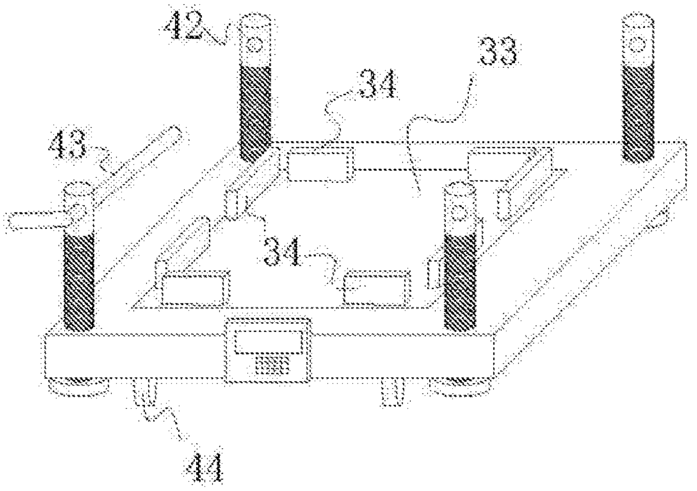
FIG. 4 is a schematic diagram of a weighing limiting bearing frame in an embodiment of the present disclosure.
Figure 5:
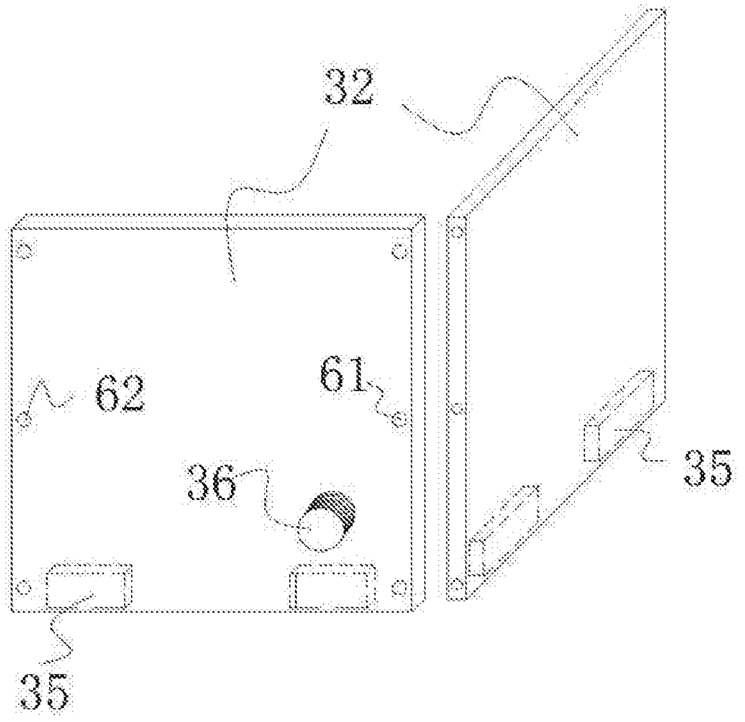
FIG. 5 is a schematic diagram of a limiting plate in an embodiment of the present disclosure.
Figure 6:
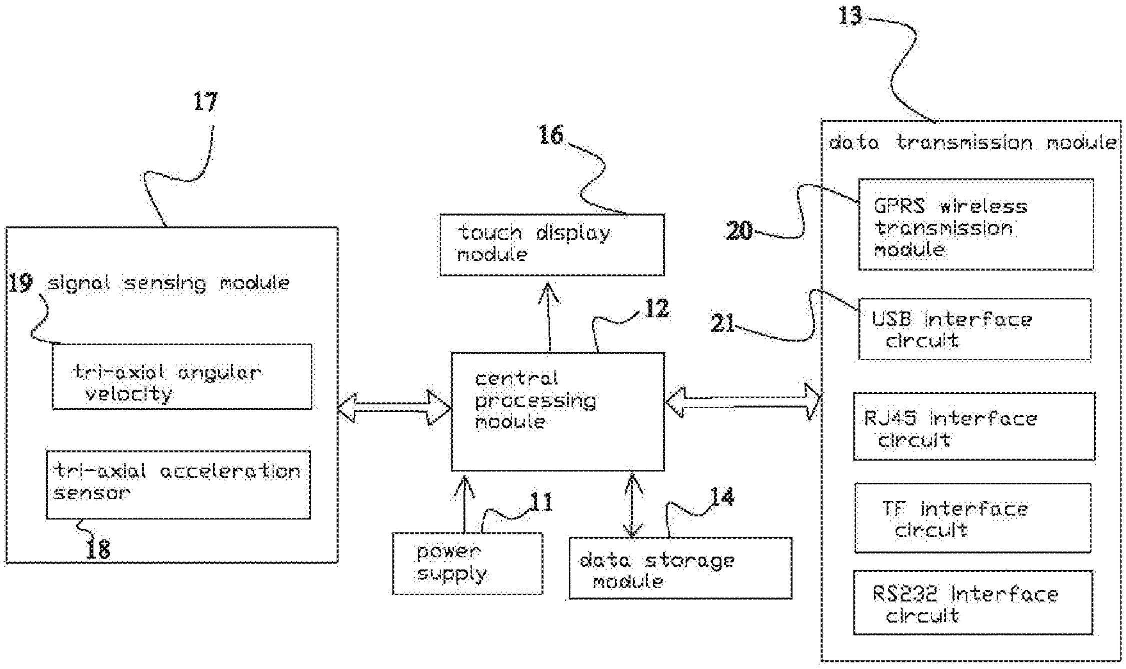
FIG. 6 is a circuit principle block diagram of an elevator operation quality detector in an embodiment of the present disclosure.

Referring to FIGS. 1 to 6, the embodiment provides an elevator operation quality detecting system, comprising an elevator operation quality detector 1, which comprises a power supply 11 having charging function, a central processing module 12, a data transmission module 13, a data storage module 14, a data acquisition module 15, and a touch display module 16, the data transmission module 13, the data storage module 14, the data acquisition module 15, and the touch display module 16 are all connected to the central processing module 12. The data acquisition module 15 is connected with a signal sensing module 17, the signal sensing module 17 comprises a tri-axial acceleration sensor 18 and a tri-axial angular velocity gyroscope 19 both connected to the data acquisition module 15; the data transmission module comprises a GPRS wireless transmission module 20 and a USB interface circuit 21 both connected to the central processing module; in this embodiment, the data transmission module further comprises RJ45 interface circuit, TF interface circuit, RS232 interface circuit, etc., The central processing module is the DSP main controller. The detecting system further comprises the weighing limiting bearing frame 3, a water belt 2, a water charging/discharging hose 4. The elevator operation quality detector further comprises a square housing 5, four foot cushions 06 are provided around a bottom of the square housing, the foot cushions 06 are composed of small lifting cylinders, movable ends of the small lifting cylinders are provided with anti-slip gaskets 7; the small lifting cylinders are driven by cylinder driving circuits 22, the cylinder driving circuits are connected with the said central processing module 12. Referring to FIG. 1, the housing of the elevator operation quality detector is provided with a USB interface 51, a RJ45 interface 52, a TF interface 53, a RS232 interface 54, an antenna 55, a power supply indicator 56, a charging interface 57 and a switching button 58. In this embodiment, the elevator operation quality detector 1 can also be an EVA-625 elevator comprehensive operation quality analyzer, which is not limited here.

The weighing limiting bearing frame 3 comprises a base 31 and four limiting plates 32, with a weighing area 33 in a middle of the base, a limiting column 34 at a periphery of the weighing area 33, and a limiting holes 35 at a bottom of the limiting plate 32 for inserting the limiting column 34 so that the four limiting plates can form a limiting frame over the said weighing area. Referring FIG. 5, once the limiting frame is fixed, the limiting frame can be fixed by screws through the screw hole 62; a lower end of one limiting plate is provided with an opening 36, the water belt 2 is placed in the limiting frame and a water charging/discharging outlet 37 of the water belt are exposed by the opening 36; the water charging/discharging outlet 37 is provided with a gate switch 38; one end of the water charging/discharging hose 39 is connected to the water charging/discharging outlet 37 and the other end is used to connect the water intake pipeline (not shown in the FIGS.). The front side of the base 31 is provided with a weight display panel 40, and the weight display panel shows a weight of water obtained in the weighing area plus a weight of the weighing limiting bearing frame itself.

In an embodiment of the disclosure, a side wall of the housing 5 is provided with a handle 8, which makes it easy for users to carry.

Figure 7:
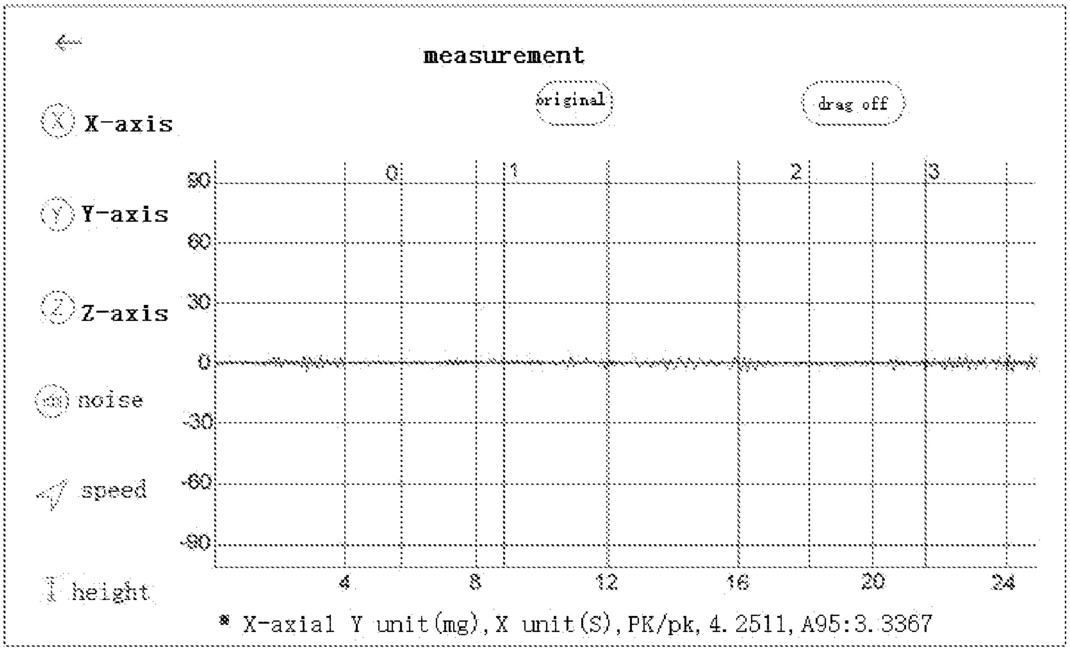
FIG. 7 is a schematic diagram of a measurement waveform display of a touch display module in an embodiment of the present disclosure.

Referring to FIG. 7, in an embodiment of the disclosure, the touch display module described can display a measuring waveform and the measuring waveform interface can be switched to the corresponding real-time waveform interface by clicking on buttons “X-axis”, “Y-axis”, “Z-axis” and “Noise”.

On the measuring waveform interface, when the two fingers are adjusted up and down, the Y-axis will zoom, when the two fingers are adjusted left and right, and the X-axis will zoom. After the Y-axis or X-axis zoom, clicking the “pull off” button and switching to the “pull open” state, which can drag the entire waveform.

In an embodiment of the disclosure, a peripheral side of the base is provided with an adjustable strut 41, and an upper end of the adjustable strut is provided with a height adjustment hole 42 to facilitate users to adjust the height of the adjustable strut through the height adjustment hole by an L-shaped steel bar 43; a bottom of the base is provided with universal rollers 44. When the adjustable strut is adjusted to less than the height of the universal rollers, the base can be moved by the universal rollers.

Another object of the present disclosure is to provide an elevator operation quality detecting method based on the above-mentioned elevator operation quality detecting system, which comprises the following steps:

Step S01: operating the elevator 61 to the lowest floor, opening the elevator and assembling the weighing limiting bearing frame in an elevator compartment;

Step S011: placing the base in the elevator compartment, inserting the limiting plate to the corresponding limiting column to form a limiting frame, and locking the limiting frame through screw holes;

Step S012: placing the water belt in the limiting frame and exposing the water charging/discharging outlet from the opening;

Step S013: adjusting the said limiting column by the L-shaped steel bar to keep the said weight limiting bearing frame horizontal;

Step S02: connecting one end of the water charging/discharging hose to the said water charging/discharging outlet and the other end to the water intake pipeline to fill the water belt;

Step S03: when the weight display panel displays a specified value, stopping water filling; closing the gate switch and removing the water filling hose;

Step S04: positioning the elevator operation quality detector in the elevator compartment and starting the elevator operation quality detector, after the elevator operation quality detector is started, collecting the initial balanced position of the elevator compartment according to the tri-axial angular velocity gyroscope and adjusting its horizontal position by controlling the small lifting cylinder;

Step S05: after the initial horizontal position is adjusted, starting the elevator base on the initial horizontal position so as to collect operation data of the elevator by the elevator operation quality detector.

In an embodiment of the present disclosure, in Step S03, the specified value is set from low to high according to the elevator weighting measurement point.

In an embodiment of the present disclosure, further comprises controlling the elevator from the lowest floor to the highest floor and then from the highest floor to the lowest floor.

In an embodiment of the present disclosure, wherein when the elevator is at the lowest floor, one worker sets a floor to be stopped during the elevator ascent; after an ascending of the elevator is finished, another worker at the top floor sets a floor to be stopped when the elevator descends.

in an embodiment of the present disclosure, the measurement of the weighting measuring point of each elevator is repeated from Step S03 to Step S05.

The disclosure improves the detection accuracy by automatically adjusting the horizontal position of the elevator operation quality detector, and simulating the heavy block by water, which not only saves the transportation cost and manual handling cost of the weight, but further allows the whole equipment to be disassembled, assembled, and carried easily. The disclosure applies water to the elevator detection with unique concept and solves the existing problems: 1. The elevator compartment tilts within the allowable range, the test data of the elevator will result in errors; 2. under different load conditions, the elevator needs to handle the heavy blocks to simulate the load-bearing personnel, which will cause a great deal of manpower to handle the heavy blocks during the test process; 3. only record data, there is no intuitive display of operating waveform parameters; 4. it is necessary for the detector to stand in elevator to observe the operation status of the equipment and record problems.

The above description is only a preferred embodiment of the disclosure and any uniform changes and modifications to the patent scope applied for in accordance with the disclosure shall fall within the scope of the disclosure.

What is claimed is:

1. An elevator operation quality detecting system, comprising an elevator operation quality detector, the elevator operation quality detector comprises a power supply having a charging function, a central processing module, a data transmission module, a data storage module, a data acquisition module, and a touch display module; the data transmission module, the data storage module, the data acquisition module, and the touch display module are all connected to the central processing module; the data acquisition module is connected to a signal sensing module, the signal sensing module comprises a tri-axial acceleration sensor and a tri-axial angular velocity gyroscope which are both connected to the data acquisition module; the data transmission module comprises a GPRS wireless transmission module and a USB interface circuit which are both connected to the central processing module; the central processing module is a DSP main controller; wherein the detecting system further comprises a weighing limiting bearing frame, a water belt, a water charging/discharging hose; the elevator operation quality detector further comprises a square housing, four foot cushions are provided around a bottom of the square housing, the foot cushions are composed of lifting cylinders, movable ends of the lifting cylinders are provided with anti-slip gaskets; the lifting cylinders are driven by cylinder driving circuits, the cylinder driving circuits are connected with the said central processing module; the weighing limiting bearing frame comprises a base and four limiting plates, the base is provided with a weighing area in a middle of the base, a periphery of the weighing area is provided with a limiting column, and bottoms of the limiting plates are provided with limiting holes for inserting the limiting column so that the four limiting plates form a limiting frame above the weighing area, in which a lower end of one limiting plate is provided with an opening, the water belt is placed in the limiting frame and a water charging/discharging outlet of the water belt are exposed by the opening; the water charging/discharging outlet is provided with a gate switch; one end of the water charging/discharging hose is connected to the water charging/discharging outlet and the other end is used to connect a water intake pipeline; a front side of the base is provided with a weight display panel, and the weight display panel shows a weight of water obtained in the weighing area plus a weight of the weighing limiting bearing frame itself.

2. The elevator operation quality detecting system according to claim 1, wherein a side wall of the housing is provided with a handle.

3. The elevator operation quality detecting system according to claim 1, wherein a peripheral side of the base is provided with an adjustable strut, and an upper end of the adjustable strut is provided with a height adjustment hole to facilitate users to adjust the height of the adjustable strut through the height adjustment hole by an L-shaped steel bar; a bottom of the base is provided with universal rollers.

* * * * *